United States Patent [19]

Seki

[11] Patent Number: 5,377,188

[45] Date of Patent: Dec. 27, 1994

[54] COMMUNICATION SYSTEM CAPABLE OF DETECTING MISSED MESSAGES

[75] Inventor: Toshibumi Seki, Yokohama, Japan

[73] Assignee: Kabushiki Kaisha Toshiba, Kawasaki, Japan

[21] Appl. No.: 121,246

[22] Filed: Sep. 15, 1993

[30] Foreign Application Priority Data

Sep. 18, 1992 [JP] Japan .................................. 4-249276

[51] Int. Cl.⁵ ......................... H04J 3/14; G06F 11/00
[52] U.S. Cl. ..................................... 370/85.1; 371/32
[58] Field of Search ....................... 370/94.1, 85.1, 13, 370/16, 17; 371/32, 34, 35

[56] References Cited

U.S. PATENT DOCUMENTS 5,142,538  8/1992  Fickes et al. ........................ 371/34
5,150,368  9/1992  Autruong et al. ................... 371/32
5,210,751  5/1993  Onoe et al. ........................... 371/32

OTHER PUBLICATIONS

"An Efficient Reliable Broadcast Protocol", Kaashoek et al., ACM Operating System Review, 23(4):5-19 (1989).
"Broadcast Protocols for Distributed Systems", Melliar-Smith et al., IEEE Transactions on Parallel and Distributed Systems, 1(1):17-25 (1990).

Primary Examiner—Douglas W. Olms
Assistant Examiner—Min Jung
Attorney, Agent, or Firm—Finnegan, Henderson Farabow, Garrett & Dunner

[57] ABSTRACT

A communication system comprises a communication history table for recording as a communication history the communication cycles to transmit and receive a message by the broadcast communication, a communication cumulative value comparison unit for comparing the communication cumulative value stored into the communication history table with the communication cumulative value added to the received message, and a retransmission processing unit for deciding whether a communication apparatus receiving the message or a communication apparatus transmitting the message incurs an error and, for specifying a message to be retransmitted corresponding to the message missing when the transmitting communication apparatus incurs a message error.

15 Claims, 12 Drawing Sheets

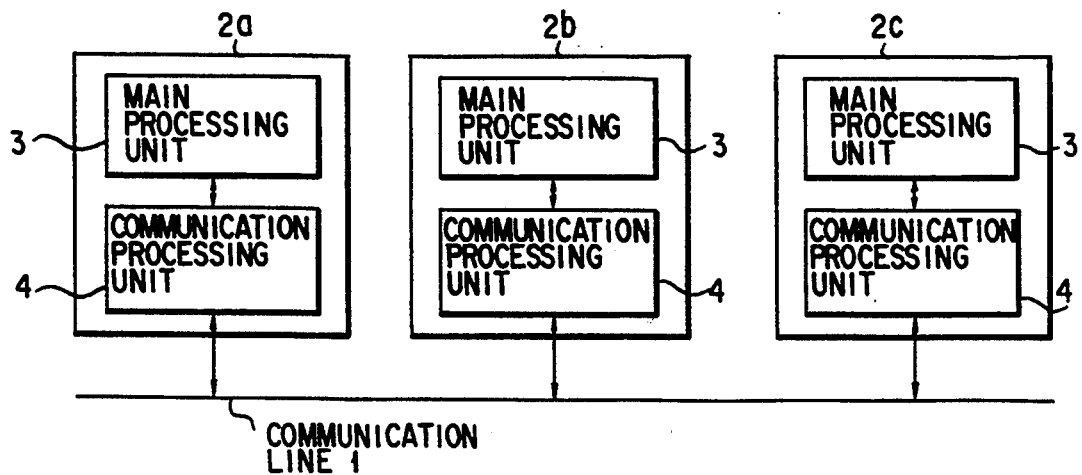
F I G. 1
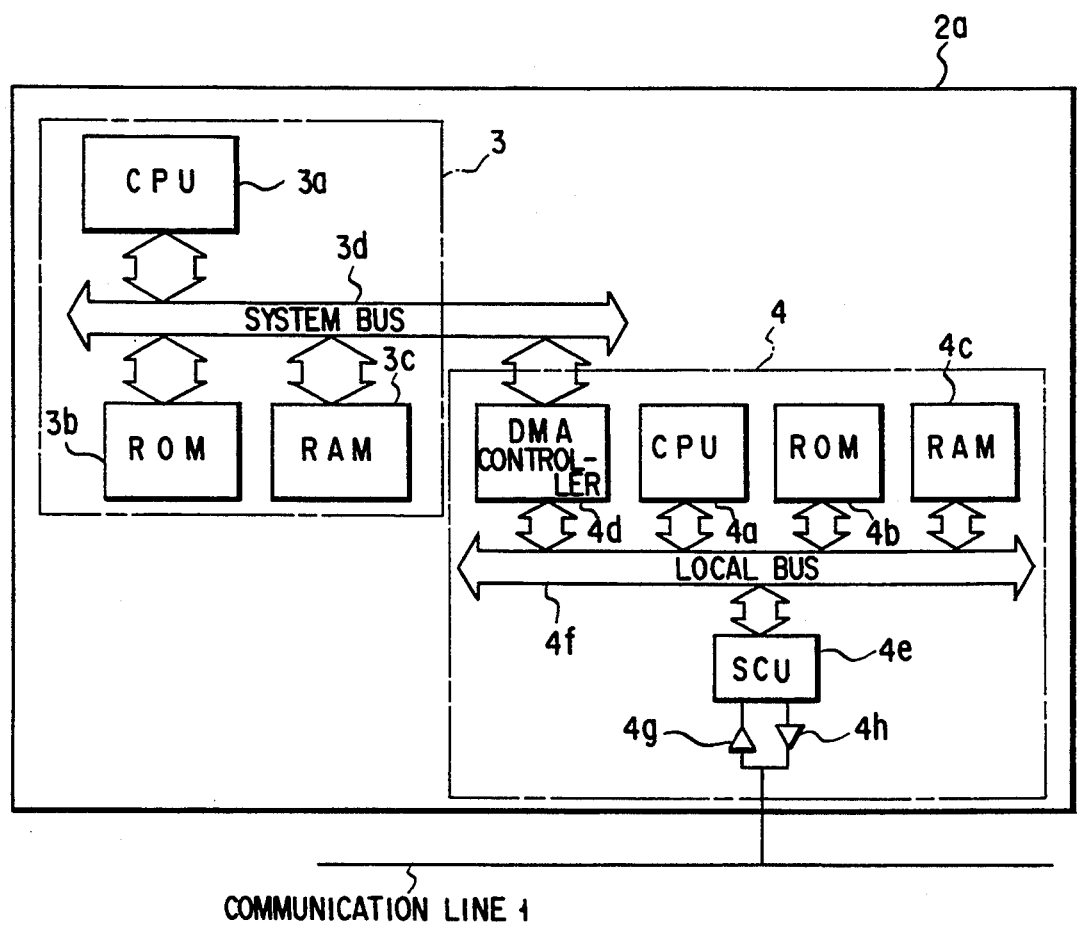
F I G. 2

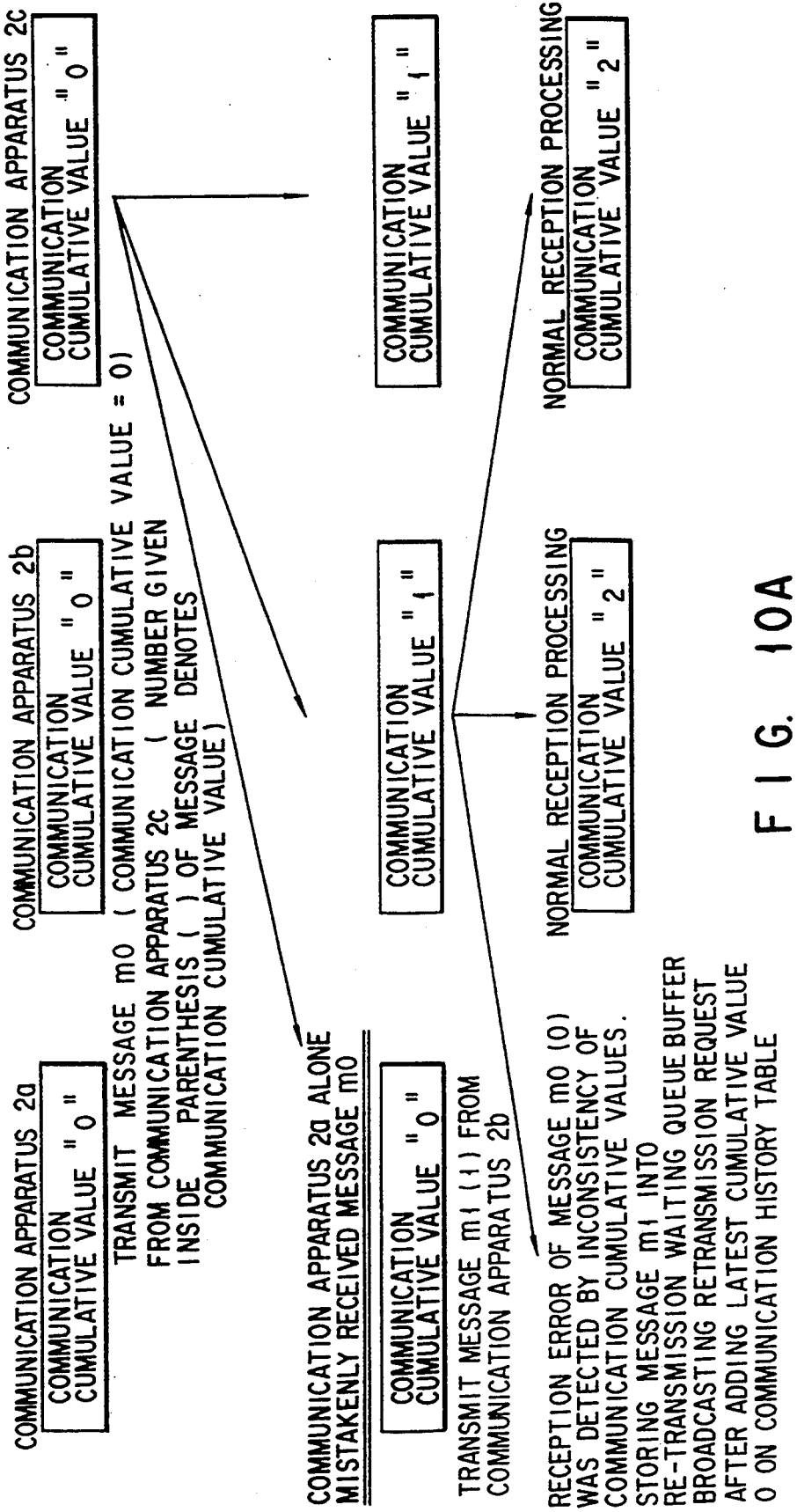

RE-TRANSMISSION REQUEST (0)

COMMUNICATION APPARATUS 2b AND COMMUNICATION APPARATUS 2c SELF CHECK IF OR NOT THEY ARE TRANSMISSION SOURCE OF MESSAGE WITH COMMUNICATION CUMULATIVE VALUE 0 WHICH IS ADDED WITH RE-TRANSMISSION REQUEST.

COMMUNICATION APPARATUS 2c WHICH IS MESSAGE TRANSMISSION SOURCE RE-TRANSMITS MESSAGE mo' (0) WHICH HAS BEEN TRANSMITTED WITH COMMUNICATION CUMULATIVE VALUE 0 BEING ADDED

COMMUNICATION APPARATUS 2b WHICH ISN'T TRANSMISSION SOURCE ENDS PROCESSING.

RE-TRANSMISSION MESSAGE m'0 (0)

AFTER HAVING RECEIVED AND PROCESSED RE-TRANSMITTED MESSAGE m0' (0) AND DELIVERED IT TO MAIN PROCESSING UNIT PROCESS MESSAGE m1 (1) INSIDE RE-TRANSMISSION WAITING QUEUE AND DELIVER IT TO MAIN PROCESSING UNIT.
AS A RESULT, EACH OF MESSAGES mo AND m1 CAN BE RECEIVED IN SAME ORDER AS EACH OF COMMUNICATION APPARATUSES 2b AND 2c, AND COMMUNICATION CUMULATIVE VALUE BECOMES "2" WHICH IS EQUAL TO THAT OF OTHER SITES.

| COMMUNICATION CUMULATIVE VALUE "2" |
|---|

| FIG. 12A |
|---|
| FIG. 12B |

FIG. 12A

COMMUNICATION APPARATUS 2a
| COMMUNICATION CUMULATIVE VALUE "0" |

COMMUNICATION APPARATUS 2b
| COMMUNICATION CUMULATIVE VALUE "0" |

COMMUNICATION APPARATUS 2c
| COMMUNICATION CUMULATIVE VALUE "0" |

TRANSMIT MESSAGE m2 (COMMUNICATION CUMULATIVE VALUE = 0) FROM COMMUNICATION APPARATUS 2c (NUMBER GIVEN INSIDE PARENTHESIS ( ) OF MESSAGE DENOTES COMMUNICATION CUMULATIVE VALUE)

| COMMUNICATION CUMULATIVE VALUE "1" |

| COMMUNICATION CUMULATIVE VALUE "1" |

COMMUNICATION APPARATUS 2a ALONE MISTAKENLY RECEIVED MESSAGE m2

| COMMUNICATION CUMULATIVE VALUE "0" |

COMMUNICATION APPARATUS 2a, WITHOUT KNOWING THAT IT HAS MISTAKENLY RECEIVED MESSAGE, ADDED LATEST COMMUNICATION CUMULATIVE VALUE AT THAT POINT OF TIME AND TRANSMITTED MESSAGE m3 (0)

TRANSMIT MESSAGE m3 (0) FROM COMMUNICATION APPARATUS 2a

NORMAL RECEPTION PROCESSING

COMMUNICATION APPARATUSES 2b AND 2c DETECT THAT TRANSMISSION SOURCE (2a) MISTAKENLY RECEIVED MESSAGE DUE TO INCONSISTENCY OF COMMUNICATION CUMULATIVE VALUES, BUT BECAUSE THE COMMUNICATION CUMULATIVE VALUE INSIDE THE RECEPTION MESSAGE IS SMALLER THAN LATEST COMMUNICATION CUMULATIVE VALUE OF COMMUNICATION HISTORY TABLE THEY DEEM MESSAGE m3 NORMAL AND PERFORM USUAL RECEPTION PROCESSING.

| COMMUNICATION CUMULATIVE VALUE "1" | COMMUNICATION CUMULATIVE VALUE "2" |

COMMUNICATION APPARATUSES 2b AND 2c DETECT THAT TRANSMISSION SOURCE (2a) HAS MISTAKENLY RECEIVED MESSAGE ADDED BY COMMUNICATION CUMULATIVE VALUE 0, AND SELF-CHECK IF OR NOT THEY TRANSMISSION SOURCE OF MESSAGE ADDED WITH COMMUNICATION CUMULATIVE VALUE 0.

COMMUNICATION APPARATUS 2b WHICH ISN'T TRANSMISSION SOURCE ENDS PROCESSING

COMMUNICATION APPARATUS 2c WHICH IS MESSAGE (m2) TRANSMISSION SOURCE RE-TRANSMITS MESSAGE m2'(0) WHICH HAS BEEN TRANSMITTED WITH COMMUNICATION CUMULATIVE VALUE 0 BEING ADDED THERE TO.

TRANSMISSION MESSAGE m2' (0)

RECEIVE AND PROCESS RE-TRANSMITTED MESSAGE m2'(0) AND DELIVER IT TO MAIN PROCESSING UNIT AS A RESULT, COMMUNICATION CUMULATIVE VALUE BECOMES 2 WHICH IS EQUAL TO THAT OF RESPECTIVE COMMUNICATION APPARATUSES 2b AND 2c.

| COMMUNICATION CUMULATIVE VALUE "2" |

F I G. 12B

COMMUNICATION SYSTEM CAPABLE OF DETECTING MISSED MESSAGES

BACKGROUND OF THE INVENTION

1. Field of the Invention

The present invention relates to a communication system for performing a synchronous broadcast communication such as a distributed processing system for executing jobs by using, for example, a plurality of computers.

2. Description of the Related Art

In recent years, computer system have become larger and more complex, involving diversification of requests and technical sophistication. For this reason, demands are increasing for a distributed processing system for executing jobs by using a plurality of computers.

Each computer used in the system may be called a "communication main body" because it exchanges (or transmits and receives) information with the other computers.

In this type of a distributed processing system, when the computers, i.e., communication main bodies, are connected to one another by low reliable communication lines, message missing or loss is likely to happen. To prevent the message missing, it is desired to specify the missed messages and transmit them again.

Therefore, in the conventional method, in order to prevent the message missing, the transmission line is multiplexed and the received messages are compared to one another, thereby to improve reliability. Alternatively, a virtual 1-to-1 communication line is set between two application programs, and the message for reception confirmation is exchanged between these programs.

However, when the multiplexed communication line is used, the processing speed of the system decreases because the control of the multiplexed communication line is complex and there are message-reception waiting periods.

Further, when the virtual communication line is used, the processing speed of system decreases and, moreover, the broadcast communication can not be accomplished because the message for reception confirmation must be awaited during the normal communication time.

As a method of retransmitting the message when message missing occurs, there has been proposed a method of adding the message for reception confirmation into a transmission message, and a method of ordering all messages by a host computer, or adding a serial number to each message for identification. In the first method, when the transmitter which incurs message missing transmits the next message, a reception error is detected and the missed message is retransmitted. There is the possibility that the missed message is not received unless the next message is transmitted and therefore the processing interruption time lengthens. The second method entails the problems that the host computer makes a bottleneck to processing speed and reliability, the performance of the system is governed by the performance of computer, the processing for dissolving a trouble in the host computer must be carried out, and messages not relating to actual processing are required.

As described above, the conventional system employs a multiplexing communication line or a virtual communication line in order to prevent a broadcasting message from being missed. The control of communication lines is inevitably complicated, the overhead of processing the message for reception confirmation increases and the time for waiting for the confirmation is long. Consequently the processing speed of the system is low. Further, a method of retransmitting the missed message has disadvantages such as lengthening the processing interruption time, and making a bottleneck in the processing speed and reliability.

Accordingly, there is required, in order to perform actually the broadcast communication, a communication apparatus wherein the virtual communication line is unnecessary, processing overhead such as waiting is small, the message can be quickly retransmitted even if message missing occurs, and no bottleneck exists with respect to reliability and processing speed.

SUMMARY OF THE INVENTION

An object of the present invention is to provide a communication system of high reliability requiring no complex control so that overhead of processing can be decreased.

According to this invention, in a communication system being equipped with a number of communication apparatus and a communication line where a message is to be communicated, there is provided a message transmission function to this communication line and a message reception function on the communication line. The communication system is comprised of a counter unit for each communication apparatus to receive a message transmitted by one of the communication apparatuses and to count the cumulative value of reception messages, a memory unit for storing the cumulative value counted by the counter unit to form a communication history, an addition unit for adding the latest communication cumulative value stored by the memory unit to the message to be transmitted to the communication line, a comparison unit for comparing the cumulative value stored into the memory unit with the cumulative value added to the received message, a detection unit for detecting that the communication apparatus transmitting a message incurs a message missing when, as a result of the comparison by this comparison unit, the cumulative value added to the message is smaller than the latest communication cumulative value stored into the memory unit, a specifying unit for specifying the missed message when the communication apparatus incurring a message missing is detected by the detection unit, and a retransmission unit for retransmitting the message specified by the specifying unit to the communication apparatus incurring the message missing as detected by the detection unit.

Further, according to the present invention, in a communication system comprising a communication line via which a message is communicated and a plurality of communication apparatuses having a message transmission function to the communication line and a message reception function on the communication line, each of the communication apparatuses comprises a counter unit for receiving a message transmitted by one of the communication apparatuses and counting it to obtain a cumulative count value, and a memory unit for storing the cumulative count value counted by the counter unit as the communication history. Each communication apparatus also includes an addition unit for adding the latest communication cumulative count value stored by the memory unit to the message to be transmitted to the communication line, a comparison unit for comparing the cumulative count value stored into the memory unit with the cumulative count value added to the received message, a detection unit for detecting that the corresponding communication apparatus incurs a message missing when, as a result of comparisons by the comparison unit, the cumulative count value added to the message is larger than the latest communication cumulative value stored into the memory unit, a specifying unit for specifying the missed message when the message missing is detected by the detection unit, and a retransmission request unit for requesting the retransmission of the message specified by the specifying unit.

According to the present invention, since the missing of a message in the communication apparatus is estimated and the message which may be missed can be specified, the communication for reception confirmation between the communication apparatuses, the time for waiting for receiving the message therefor is eliminated, and the retransmission of missed message can be executed while making the overhead of processing to be extremely small.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the schematic structure of a communication system relating to one embodiment of this invention;

FIG. 2 is a block diagram of each communication apparatus;

FIG. 10 includes FIGS. 10A and 10B positioned as shown, which are views for explaining the detection of each message receiving error and the flow of retransmission processing executed when a communication apparatus incurring a message receiving error receives a message;

FIG. 12 includes FIGS. 12A and 12B positioned as shown, which are views explaining the detection of a receiving and error and the flow of retransmission processing executed when the communication apparatus incurring a message missing transmits a message.

DETAILED DESCRIPTION OF THE PREFERRED EMBODIMENTS

Figure 3:
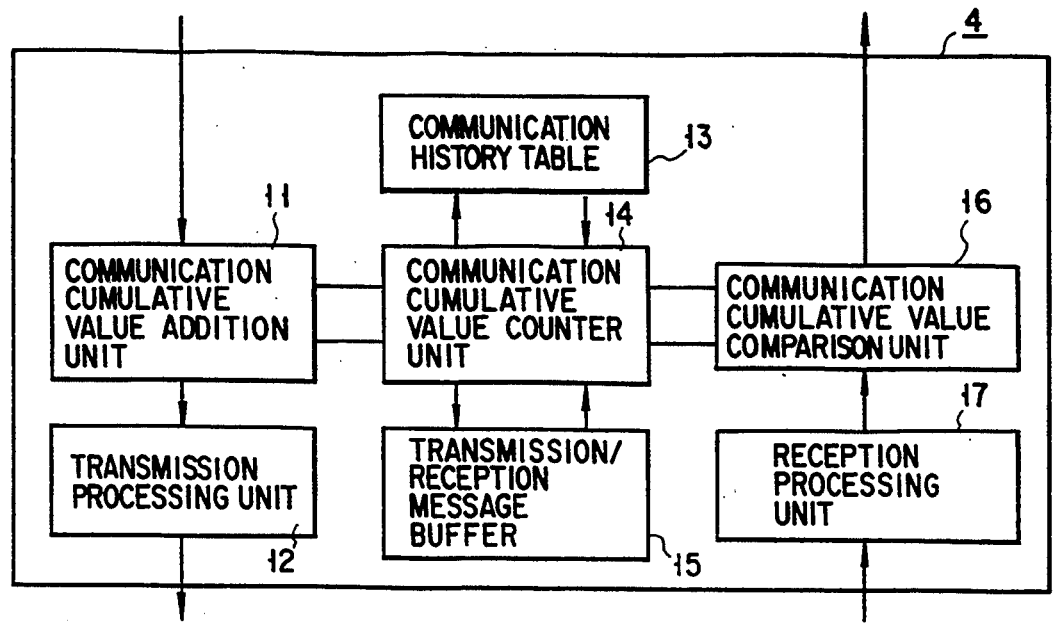
FIG. 3 is a function block diagram of a communication processing unit of the communication apparatus.

According to an embodiment shown in FIG. 1, the communication system comprises a communication line 1 and a plurality of communication apparatuses (computers) 2a, 2b, 2c, . . . connected to the communication line.

Each of communication apparatuses 2a, 2b, 2c, . . . comprises a main processing unit 3 for executing the processing inherent to every communication apparatus and a communication processing unit 4 connected to the communication line 1 for executing the exchange of information by the broadcast among the communication apparatuses.

In other words, the main processing unit 3 of each of the communication apparatuses 2a, 2b, 2c, . . . exchanges the information with the other communication apparatuses by transmitting a message to the communication line 1 or receiving a message on the communication line 1 via the respective communication processing units 4.

FIG. 2 schematically shows the structures of the main processing unit 3 and communication processing unit 4 with the communication apparatus 2a, for example. According to this figure, the main processing unit 3 comprises a CPU (Central Processing Unit) 3a, a ROM (Read Only Memory) 3b and RAM (Random Access Memory) 3c in charge of the main processing, and a system bus 3d for connecting them with each other.

The communication processing unit 4 comprises a CPU 4a, ROM 4b, RAM 4c, DMA (Dynamic Memory Access) controller 4d, SCU (Serial Communication Unit) 4e in charge of the communication processing, and a line receiver 4g and line driver 4h installed between a local bus 4f and an SCU4e for connecting them to each other. In this structure, the transmission message to be transmitted is transmitted to the communication line 1 via the SCU 4e, and the reception message on the communication line 1 is received via the SCU4e. The DMA controller 4d of the communication processing unit 4 is also connected to the system bus 3d of the main processing unit 3, and the message is exchanged between the main processing unit 3 and the communication processing unit 4 via the DMA controller 4d.

FIG. 3 shows the structure of communication processing unit 4 in the form of the function blocks. In other words, the communication processing unit 4 comprises a communication cumulative value addition unit 11, a transmission processing unit 12, a communication history table 13, a communication cumulative value counter unit 14, a transmission and reception message buffer 15, a communication cumulative value comparison unit 16 and a reception processing unit 17.

During the transmission of a message, the communication cumulative value addition unit 11 adds the latest communication cumulative value obtained via the communication cumulative value counter unit 14 to the message body from the main processing unit 3 for generating a transmission message and for requesting the transmission (broadcast) of that transmission message to the transmission processing unit 12. The transmission processing unit 12 processes the signal to transmit the transmission message produced by the communication cumulative value addition unit 11 to the communication line 1.

The communication history table 13 has a plurality of records each containing a region for storing the communication cumulative value added to the message to be transmitted and a region for storing a pointer address of transmission message buffer in the transmission and reception message buffer 15 which temporarily stores the transmission message.

Figure 4:
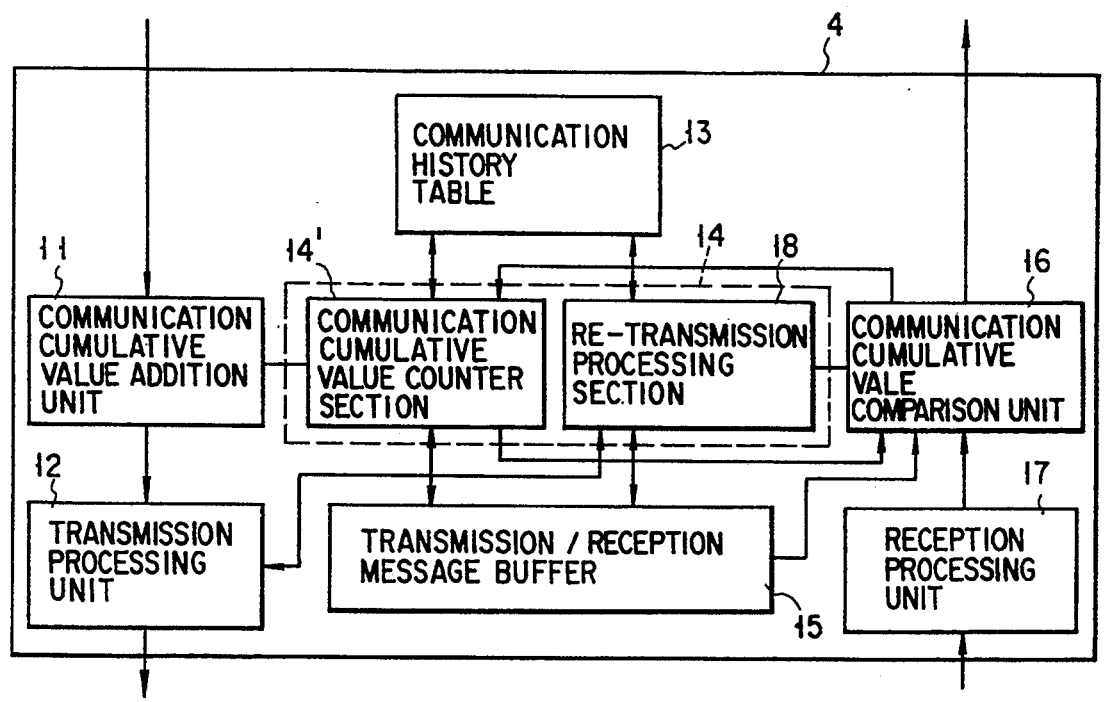
FIG. 4 is a block diagram further concretely showing the communication processing unit of FIG. 3.
Figure 5:
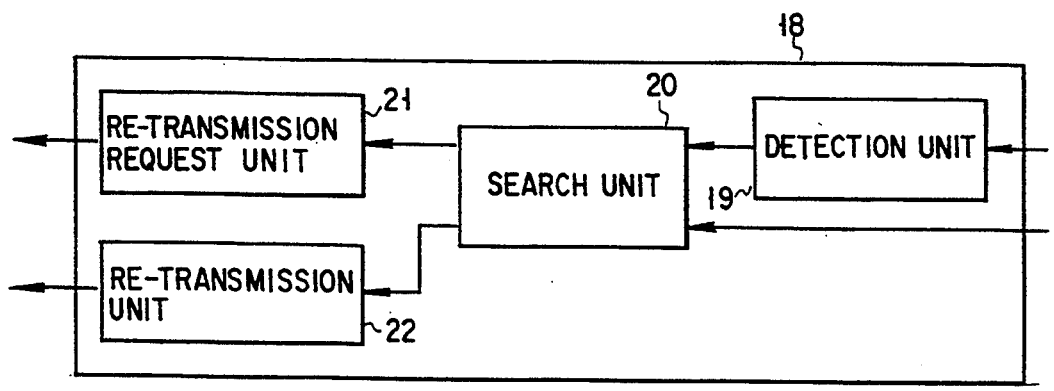
FIG. 5 is a detailed block diagram of the retransmission processing unit of FIG. 4.

The communication cumulative value counter unit 14 not only counts the communication cycles of messages but also controls the communication history table 13 and the transmission and reception message buffer 15, and processes the retransmission based on the instructions from the communication cumulative value addition unit 11 or the communication cumulative value comparison unit 16. For executing the retransmission processing, the communication cumulative value counter unit 14 comprises a communication cumulative value counter circuit 14' for counting the communication cycles and a retransmission processing circuit 18 for processing the retransmission as shown in FIG. 4. In addition, and as seen in FIG. 5, the retransmission processing unit 18 comprises a detection unit 19 for detecting a communication error, a search unit 20 for searching for a missed message, a retransmission request unit 21 for requesting the retransmission of the missed message specified by the search unit 20, and a retransmission unit 22 for executing the retransmission of the missed message in response to the request for the retransmission.

The transmission and reception message buffer 15 includes a transmission message buffer for storing the message body transmitted by the transmission processing unit 12 and a retransmission waiting queue buffer for storing the reception message when a reception error (message missing) is detected by the communication cumulative value comparison unit 16.

The communication cumulative value comparison unit 16 not only detects the reception error of a transmission message but also transmits the normally received reception message to the main processing unit 3 by comparing the communication cumulative value added to the reception message received via the reception processing unit 17 with the communication cumulative value stored on the communication history table 13, via the communication cumulative value counter unit 14. The reception processing unit 17 accepts the transmission message sent out from another communication apparatus via the communication line 1, and sends it to the communication cumulative value comparison unit 16 as a reception message. When the reception error is detected by the communication cumulative value comparison unit 16, the communication cumulative value comparison unit 16 requests a retransmission processing to the retransmission processing unit 18 of the communication cumulative value counter unit 14, using the communication cumulative value and source communication apparatus information contained in the reception message as parameters. The communication cumulative value counter unit 14 retransmission requested by the communication cumulative value comparison unit 16 determines from the input parameter and the contents of the communication history table 13 whether the corresponding communication apparatus or the source communication apparatus takes a receiving error. If the source communication apparatus takes a receiving error and also the corresponding communication apparatus is a message transmission source, a message corresponding to the receiving error is reproduced from the transmission message buffer of the transmission/reception buffer 15 as a missing message and is send out. If the corresponding communication apparatus takes a receiving error, it designates the transmission processing unit 12 to send out the retransmission request message.

Figure 6:
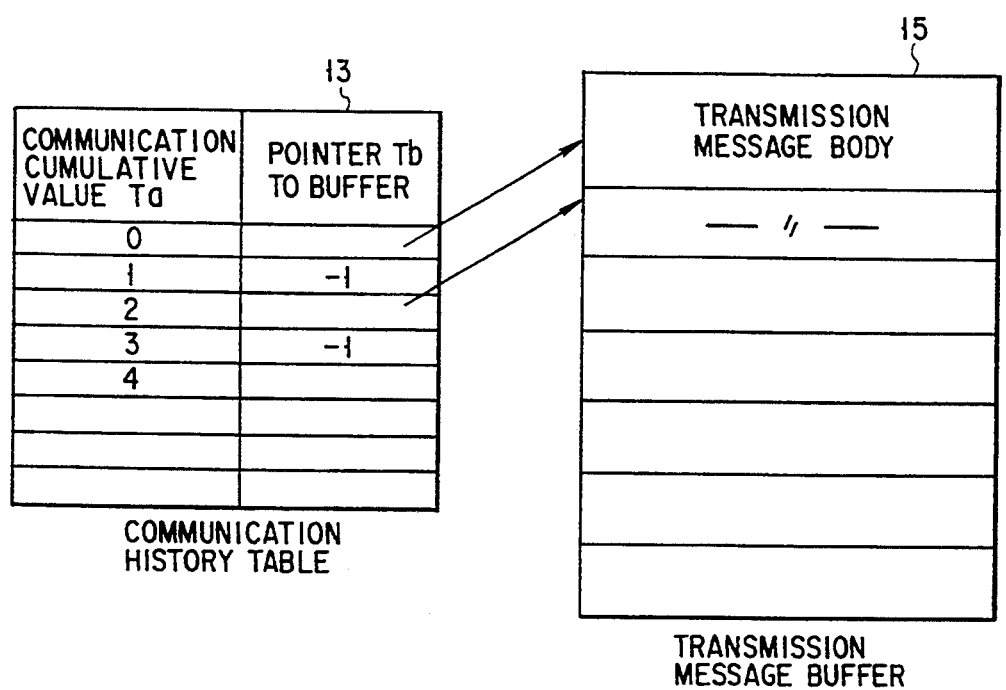
FIG. 6 is a view showing the relationship between a communication history table and a transmission message buffer.

FIG. 6 shows the relationship between the communication history table 13 and the transmission message buffer in the transmission and reception message buffer 15. The communication history table 13, for example, is used as a ring buffer and comprises a buffer for the communication cumulative value Ta added to the transmitted and received messages (the details of messages are being described later) and a buffer for a pointer Tb which is a pointer address in the memory region for a transmission message body in the transmission message buffer.

The communication cumulative value Ta is the cumulative value of the messages transmitted and received by the communication apparatuses 2a, 2b, 2c, . . . In the embodiment, the value indicates the cycles of transmissions and receptions of each communication apparatus, namely the transmission and reception cycles to show the number of communications. The pointer Tb is used when retransmitting the missed message (the transmission message which may have missed) corresponding to the retransmission demand. For example, if the transmission and reception cycle is used as the communication cumulative value Tb, the pointer Ta indicates the top address in the buffer region in the transmission message buffer in which the respective transmission messages are stored. However, the record having the pointer Tb="−1" indicates that the message having the communication cumulative value Ta within its record is the reception message from another communication apparatus. In other words, the data stored into the transmission message buffer 15 is only the transmission message, and no reception message exists in the transmission message buffer 15.

FIG. 6 shows the relationship between the communication history table 13 and the transmission message buffer 15 in the transmission and reception message buffer, when a message to which "0" and "2" of communication cumulative value Ta are added is send out and a message to which "1" and "3" of communication cumulative value Ta are added is received. In other words, the communication cumulative values "1" and "3" corresponding to the "−1" of pointer Tb expresses the communication cumulative values added to the reception message, while the communication cumulative values "0" and "2" corresponding to the pointer Tb which is not "−1" expresses the communication cumulative values added to the transmission message. As a communication cumulative value Ta, it is possible to adopt, for example, a check sum value or a message length, etc. in addition to the cycles of transmissions and receptions used in the present embodiment.

Figure 7:
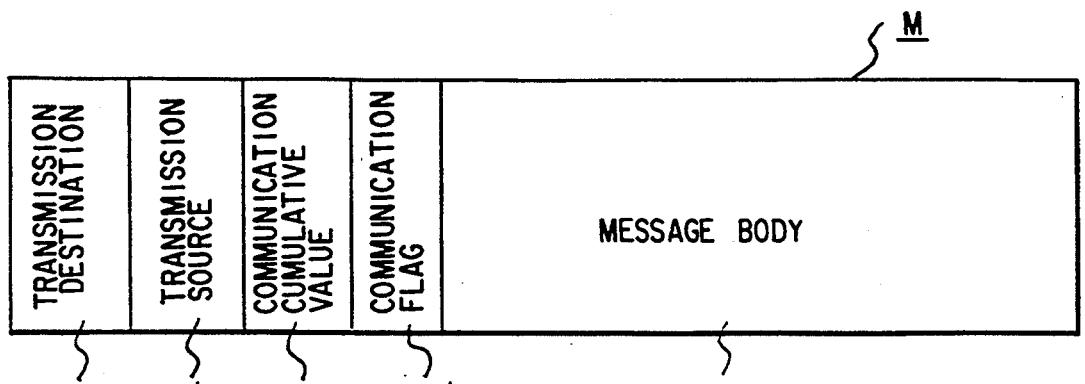
FIG. 7 is a view showing a format example of a message to be received and transmitted (in a normal mode)

FIG. 7 shows a format example of a message transmitted and received (in the normal mode). The message M includes, for example, five items including a destination apparatus Ma, a source apparatus Mb, a communication cumulative value portion Mc to which the value corresponding to the communication cumulative value Ta in the communication history table 13 is set, a communication flag Md to which the value showing the communication mode is set, and a message body Me.

As the communication flag Md, for example, three values, i.e., "a normal state" in the normal mode, "a retransmission request" for requesting the retransmission, and "a retransmission" in a retransmission mode, are prepared.

Figure 8:
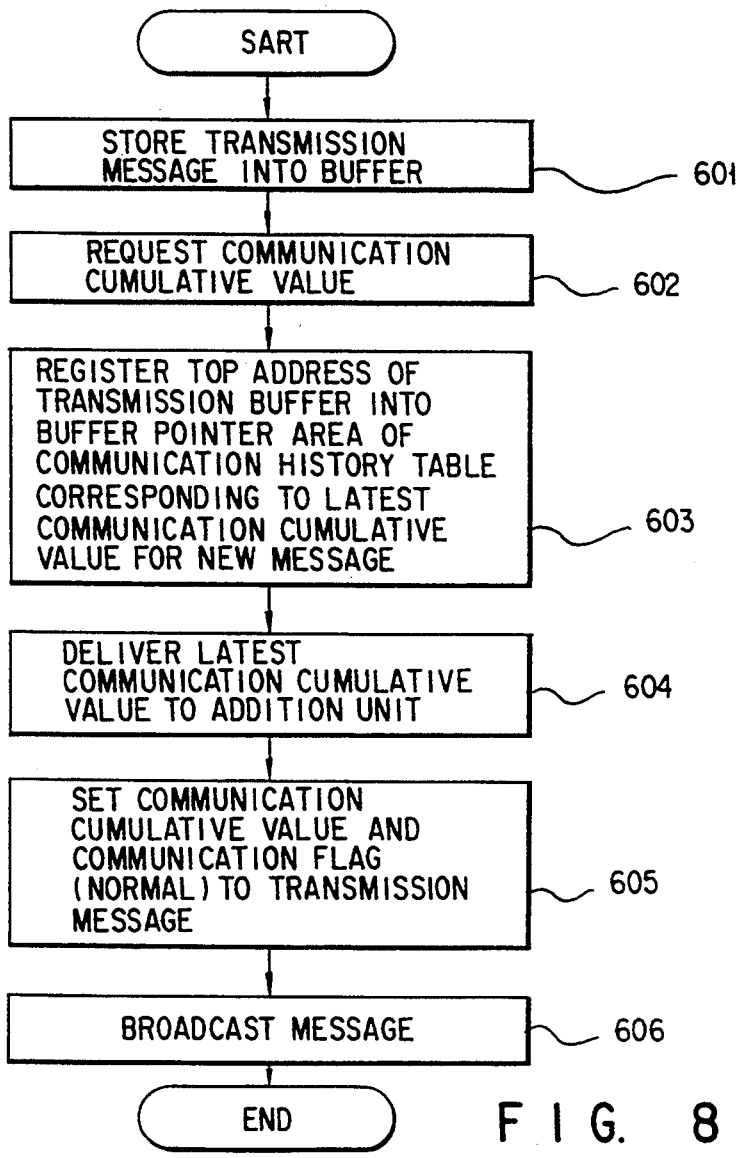
FIG. 8 is a flow chart for explaining the flow of processing relating to the broadcast of each message.

There will now be described hereinafter the operation of communication apparatuses having the structures as described above, referring to a flowchart of FIG. 8.

If a message is broadcasted from a communication apparatus 2a, for example, the transmission request from the main processing unit 3 of the communication apparatus 2a is transferred to the communication cumulative value addition unit 11 in the communication processing unit 4. Then, the message to be transmitted is sent to the transmission and reception message buffer 15 via the communication cumulative value counter circuit 14' of communication cumulative value counter unit 14, and stored in the transmission message buffer of the buffer 15 (Step 601). The latest communication cumulative value Ta of the communication history table 13 is requested, using the top address the of transmission message buffer in which the message is stored (Step 602), as a parameter. In other words, the top address in which the transmission message buffer sent to the communication history table 13 is stored is registered into the pointer (Tb) area corresponding to the latest communication cumulative value Ta (Step 603). This latest communication cumulative value Ta is returned to the communication cumulative value addition unit 11 via the communication cumulative value counter circuit 14' (Step 604).

The latest communication cumulative value Ta obtained by the above way is set to the communication cumulative value portion Mc, the "normal state" to the communication flag Md, and the transmission message body to the message body Me, whereby a transmission message is formed (step 605). When the transmission message M is sent out to the communication line 1 via the transmission processing unit 12, the communication apparatus 2a broadcasts the message (Step 606).

In the retransmission, the retransmission message with the communication flag Md to which the "retransmission" is set is broadcasted on the communication line 1 via the transmission processing unit 12. Further, in the retransmission request, the transmission message with the communication flag Md to which the "retransmission request" set is broadcasted on the communication line 1 via the transmission processing unit 12.

Figure 9A:
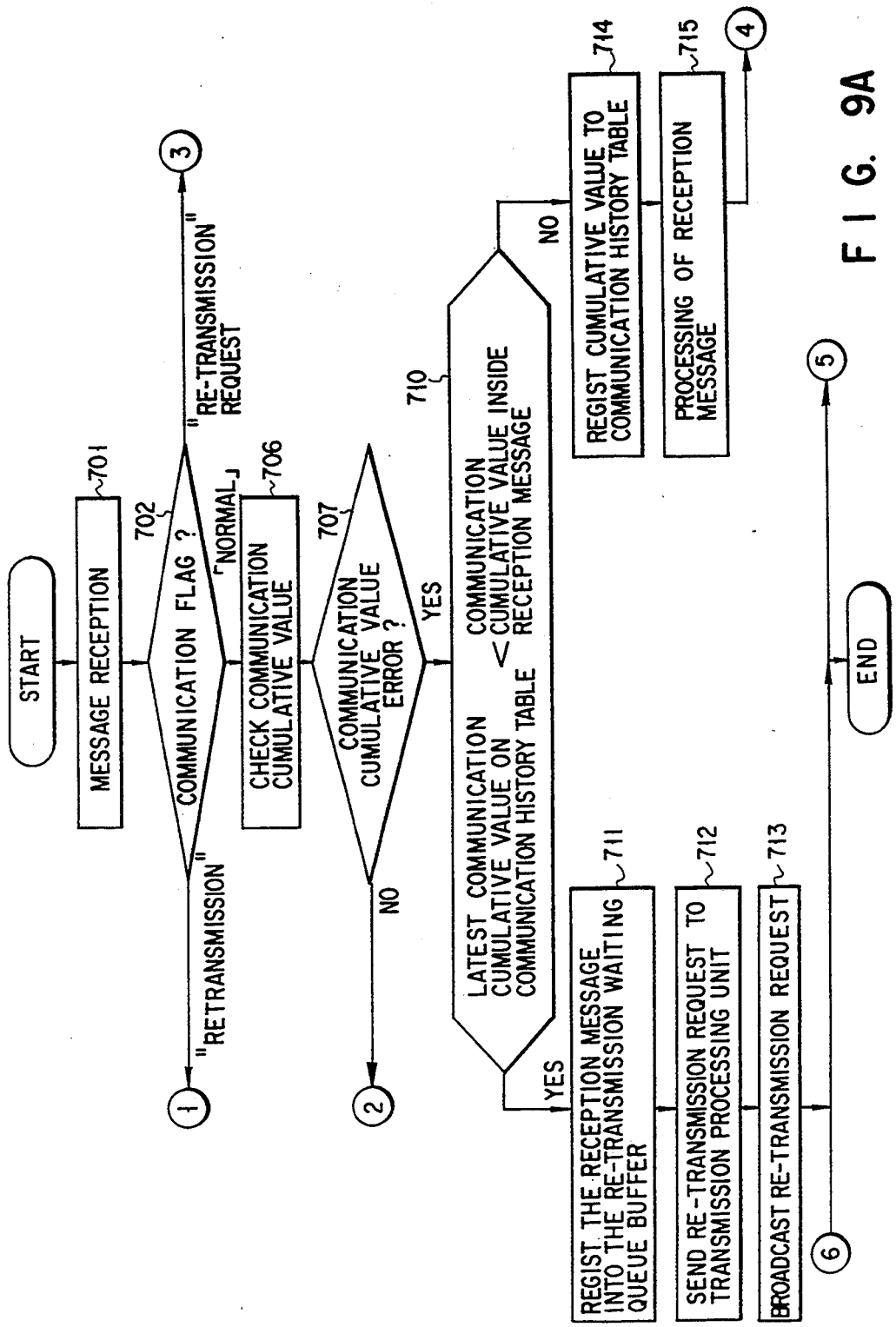
FIGS. 9A, 9B, and 9C are flow charts for explaining the flow of processing relating to the reception of each message.
Figure 9B:
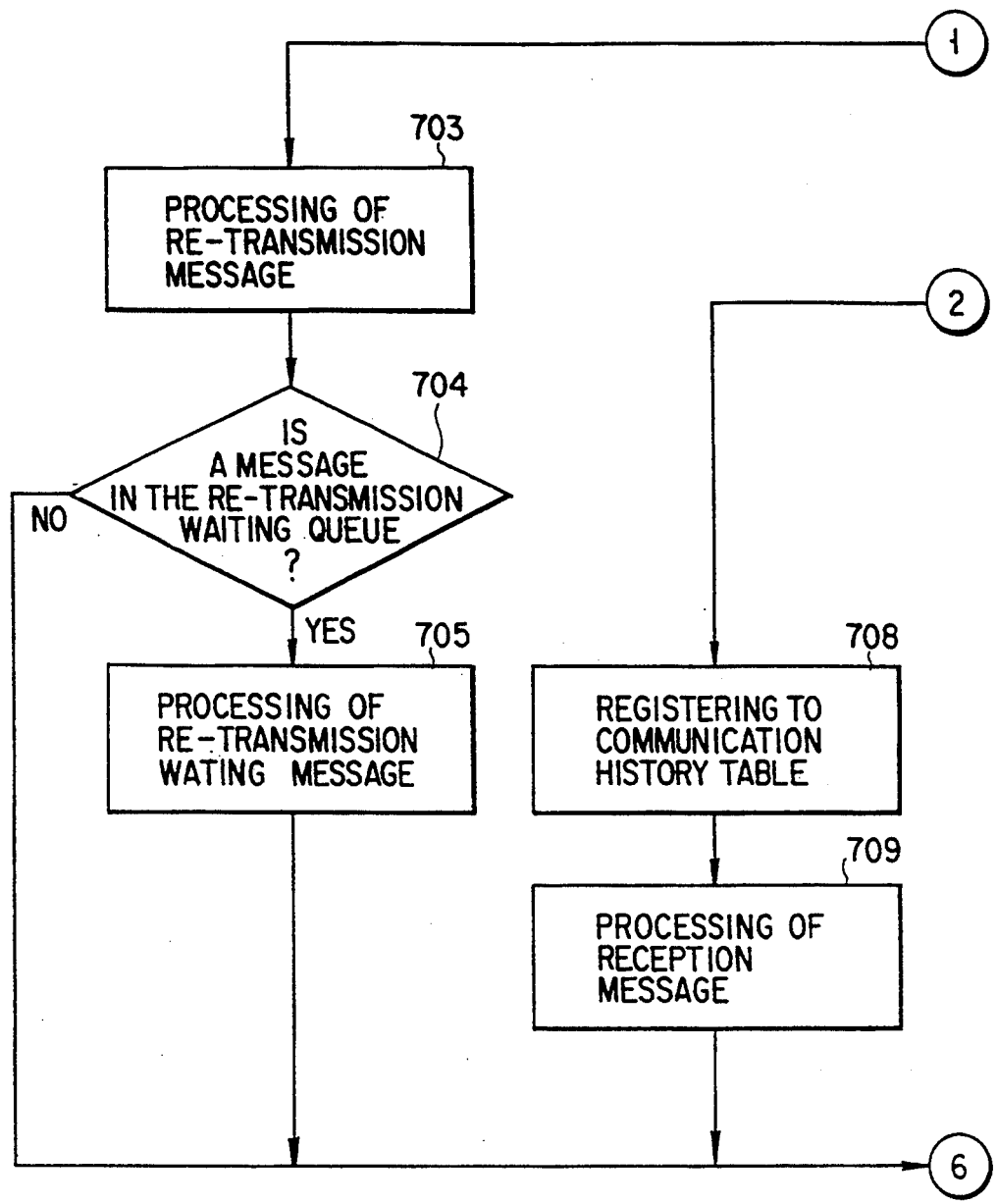
Figure 9C:
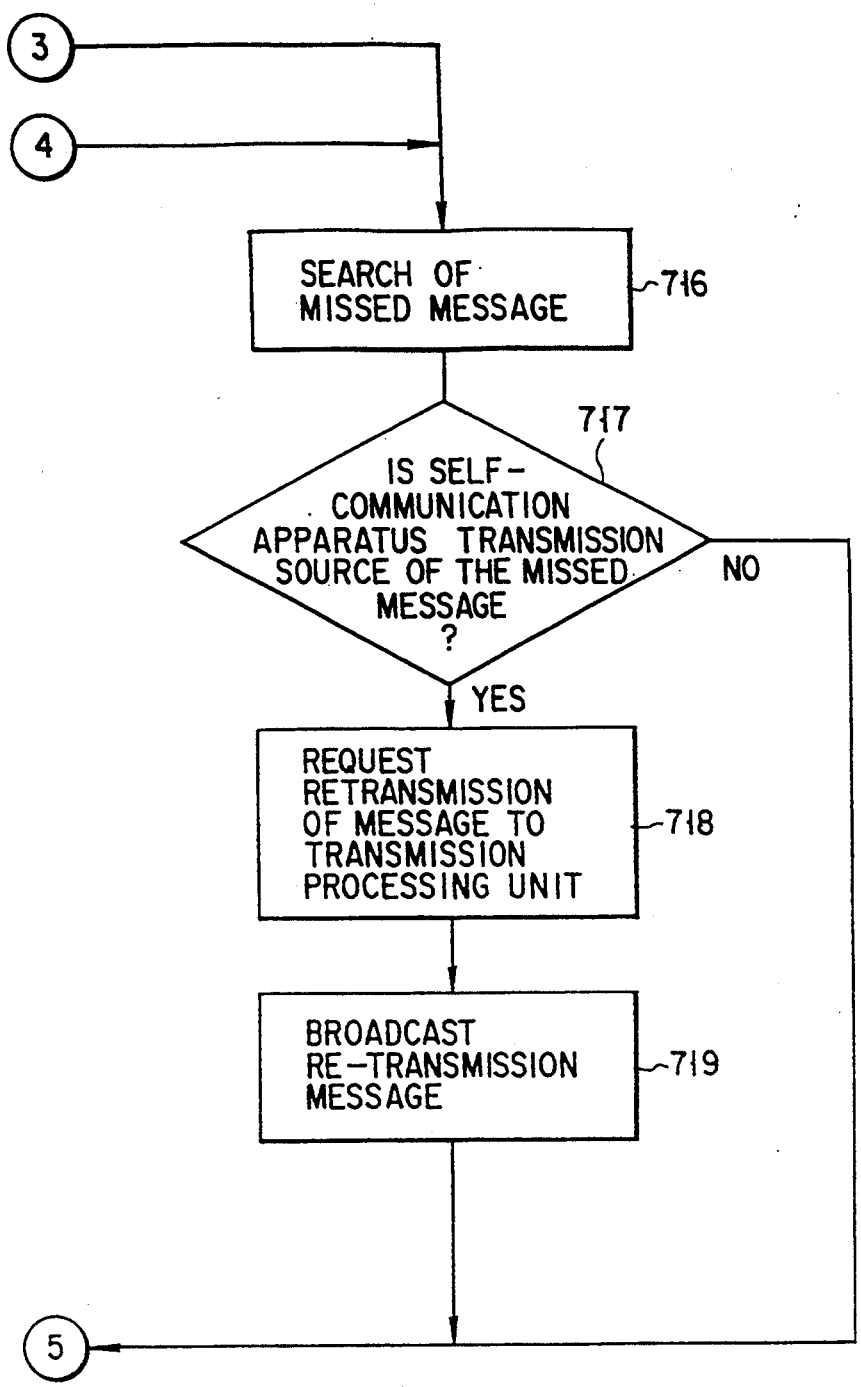

Next, the flow of processing relating to the reception of message is to be explained with reference to FIGS. 9A to 9C.

First, there is explained a case wherein a communication apparatus 2b, for example, receives a transmission message M. The message M broadcasted on the communication line 1 is received by the communication processing unit 4 of the communication apparatus 2b (Step 701). This message M is received by the reception processing unit 17 and further is transferred to the communication cumulative value comparison unit 16, then the correctness of that reception message M is confirmed. In other words, the following processing is done individually in accordance with the value of communication flag Md added to the received reception message M (Step 702).

For example, when the value of communication flag Md is "normal", whether or not any message is missed is checked by comparing the communication cumulative value Mc in the reception message with the latest communication cumulative value Ta in the communication history table 13 (Step 706). In this case, if the communication cumulative value Mc in the reception message sage M is equal to the latest communication cumulative value Ta in the communication history table obtained via the communication cumulative value counter unit 14, the message is deemed to be received correctly without a message missing (Step 707). If both the values are not equal to each other, this state is judged as being a message missing, and the processing for retransmission request as described later is executed.

If the communication cumulative value Mc in the reception message M is equal to the latest communication cumulative value Ta in the communication history table 13 being obtained via the communication cumulative value counter unit 14 and if the correct reception is confirmed, the normal reception is informed to the communication cumulative value counter unit 14 from the communication cumulative value comparison unit 16. Then, the value of "−1" which indicates the reception of the reception message is set to the buffer pointer Tb corresponding to the latest communication cumulative value Ta in the communication history table 13, and a new communication cumulative value Ta obtained by adding "1" to the latest communication cumulative value Ta is set to the next record in the communication history table (Step 708). Additionally, if the reception is judged as the normal reception, the reception message M is transferred to and processed in the main processing unit 3 (Step 709). The message M is received similarly also by the communication apparatus 2c, . . . and processed in the similar way.

The communication apparatus 2a as a transmission source for transmitting the message M also receives the message M similarly to the communication apparatuses 2b, 2c, . . . In this time, since the message transmission source does not incur the reception error of message, the communication cumulative value comparison unit 16 judges the message reception as the normal reception and informs of the normal reception to the communication cumulative value counter unit 14. When the communication cumulative value counter unit 14 judges that the transmission source of the reception message M is a computer belonging to itself, it sets a new communication cumulative value Ta obtained by adding "1" to the latest communication cumulative Ta to the next record in the communication history table 13.

In succession, there is explained the case wherein the message missing has happened and the message needs to be retransmitted.

Here, in three communication apparatuses 2a, 2b, and 2c, for example, such a case is to be explained that the communication apparatus 2b transmits a message m1 in which "1" is added to the communication cumulative value Mc under the situation that the communication apparatus 2a incure a reception error of message m0 from the communication apparatus 2c and the values of the latest communication cumulative values (initial value is 0) of the communication history tables controlled by the communication apparatuses 2a, 2b, and 2c, respectively, are set to "0", "1", and "1", respectively.

Now, suppose that the message m1 from the communication apparatus 2b is received by the communication apparatus 2a. Then, since the value of Mc in the reception message m1 differs from the value of latest communication cumulative value Ta of communication history table 13, as determined by checking the communication cumulative value at step 706, the communication error is detected (Step 707), and the retransmission processing unit 18 is started with the communication cumulative value Mc in the message m1 and the transmission source (communication apparatus 2b) as the parameters. In the detection unit 19 of the retransmission processing unit 18, the following processing is selectively executed in accordance with the relationship between the value "1" of communication cumulative value section Mc in the reception message m1 and the value "0" of latest communication cumulative value Ta on the communication history table 13 controlled by itself (Step 710).

If the value of the communication cumulative value section Mc in the reception message m1 is larger than the value Ta, as determined by a result of comparing the communication cumulative value Mc in the reception message m1 and the latest communication cumulative value Ta on the communication history table 13, the self communication apparatus detects that itself occurs the reception error (message missing). It registers the reception message m1 to the retransmission waiting queue buffer in the transmission and reception message buffer 15 in order to maintain the reception order of reception messages (Step 711). Since, in this embodiment, the value of Mc of reception message m1 is 1 and the communication cumulative value Ta is 0, the Mc is larger than Ta and the reception message m1 is stored into the retransmission waiting queue buffer.

Subsequently, the Mc is compared with the Ta in the search unit 20 in order to specify the missed message due to the reception error. In this embodiment, a message corresponding to Ta=0 is specified as a missed message. Thus, the retransmission request unit 21 is driven to make the missed message retransmit. The retransmission request unit 21 requests to the transmission processing unit 12 to retransmit the message m0 corresponding to the value "0" of the communication cumulative value Ta on the communication history table (Step 712). When the retransmission is requested, the "retransmission request" is set to the communication flag Md and also the communication cumulative value "0" added to the message corresponding to the reception error detected by the retransmission processing unit 18 is set to the communication cumulative value Mc, to form a retransmission requested message. Then the retransmission requested message is sent out on the communication line 1 to be broadcasted toward all the communication apparatuses 2b, 2c, . . . etc. (Step 713).

When the retransmission requested message is received by the communication apparatuses 2b, 2c, . . . (Step 701), that message is transferred to the communication cumulative value comparison unit 16 via the reception processing unit 17. When the communication flag Md in the message is judged to indicate "retransmission request" (Step 702), the search unit 20 in the retransmission processing unit 18 searches for the missed message from the self-communication apparatuses 2b, 2c, . . . , respectively (Step 716). In other words, the search unit 20 judges whether or not the message to be retransmitted is a message which is broadcasted by the communication apparatus belonging to itself by referring to the buffer pointer Tb corresponding to the communication cumulative value Ta on the communication history table 13, which corresponds to the value "0" of the communication cumulative value Mc in the retransmission request message in the search unit 20 (step 717). In this case, since the communication apparatus 2b judges the reception of that message m0 as having the value "−1" for buffer pointer Tb in the communication apparatus 2b, the processing is ended for communication apparatus 26 with the message m0 being not broadcasted.

On the other hand, the communication apparatus 2c judges the transmission of the message m0 since the value of buffer pointer Tb in the communication apparatus 2c indicates the top address of transmission message buffer in which the retransmission message is stored.

In this case, using the top address of the message to be retransmitted in the retransmission unit 22 and the value "0" of the communication cumulative value Ta for specifying the missed message as parameters, the retransmission request is sent to the transmission processing unit 12 (Step 718). After the message m0 is read out of the designated address in the transmission message buffer 15, and the communication flag Md is set to "retransmission" mode, the communication cumulative value is section Mc with the communication cumulative value set to "0" and the destination apparatus Ma is set indicating the communication apparatus 2a requesting the retransmission and so on and then added to the message m0. The message m0 is sent out to the communication line 1, then the retransmission message m0' is broadcasted by the communication apparatus 2c (Step 719).

If the retransmission message m0' from the communication apparatus 2c is received by the communication apparatus 2a (Step 701), the message m0' is transferred to the communication cumulative value comparison unit 16 via the reception processing unit 17. When the communication flag Md in the message m0' is judged as a "retransmission" flag by the communication cumulative value comparison unit 16 (Step 702), the message m0' is transferred to the main processing unit 3 from the communication cumulative value comparison unit 16 and reception-processed thereby (Step 703). Thereafter, if there exists the reception message m1 registered in the retransmission waiting queue buffer in the transmission and reception message buffer 15 at Step 711 (Step 704), the communication cumulative value comparison unit 16 reads the reception message m1 to be retransmitted out of the retransmission waiting queue buffer, and transfers it to the main processing unit 3. This main processing unit 3 receives the transferred reception message m1 and processes it (Step 705).

The reception message m1 which is registered into the retransmission waiting queue buffer is a message to be received after the message m0 originally missed in the communication apparatus 2a and to be processed after the retransmitted message m0'. Therefore, by registering the previously received message in a reverse order into the retransmission waiting queue buffer, the messages can be processed in the correct order along the order of transmissions.

As described above, if the communication apparatus incurring a reception error receives a normal message from another communication apparatus, the message is processed in the similar manner.

FIGS. 10A and 10B show the flow of reception error detection and retransmission processing in the case that the communication apparatus incurring the reception error receives a message when the latest communication cumulative value Ta on the communication history table 13 is smaller than the communication cumulative value Mc in the reception message, for example, in the case that the foregoing communication apparatus 2a incurring the reception error receives the messages from other normal communication apparatuses 2b.

Figure 11A:
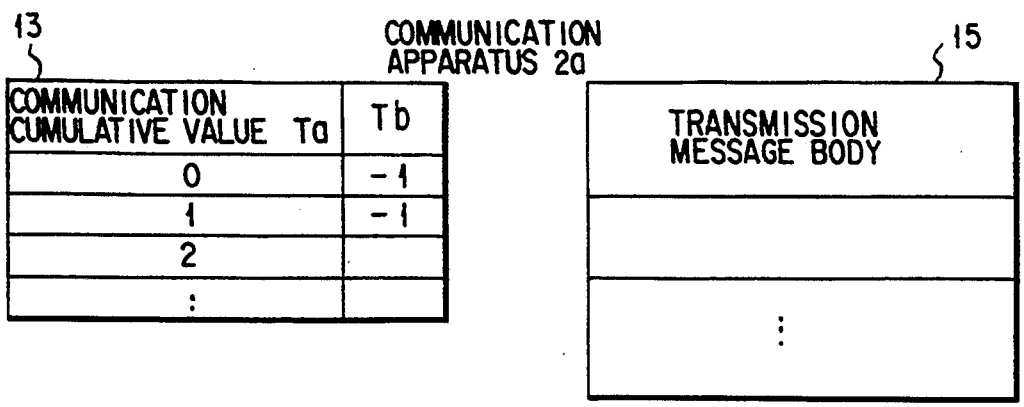
FIGS. 11A, 11B, and 11C are views for showing the communication history table and the transmission message buffer in each communication apparatus after the completion of retransmission processing is executed when the communication apparatus incurring a message missing receives a message.
Figure 11B:
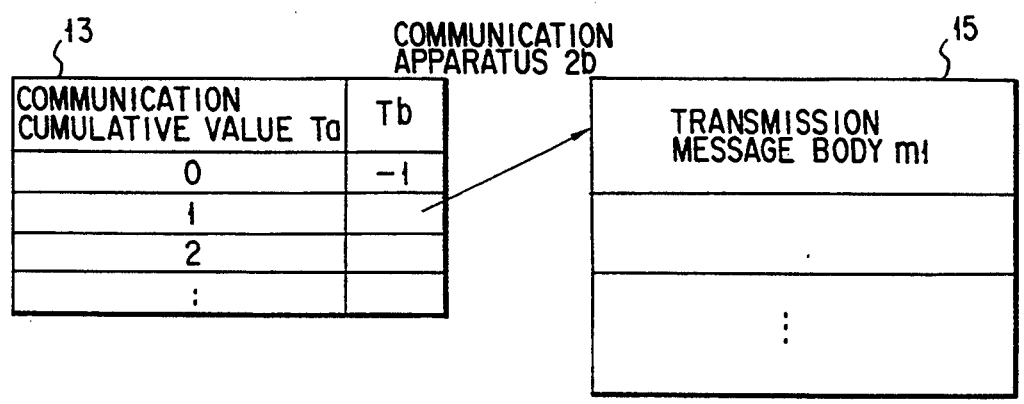
Figure 11C:
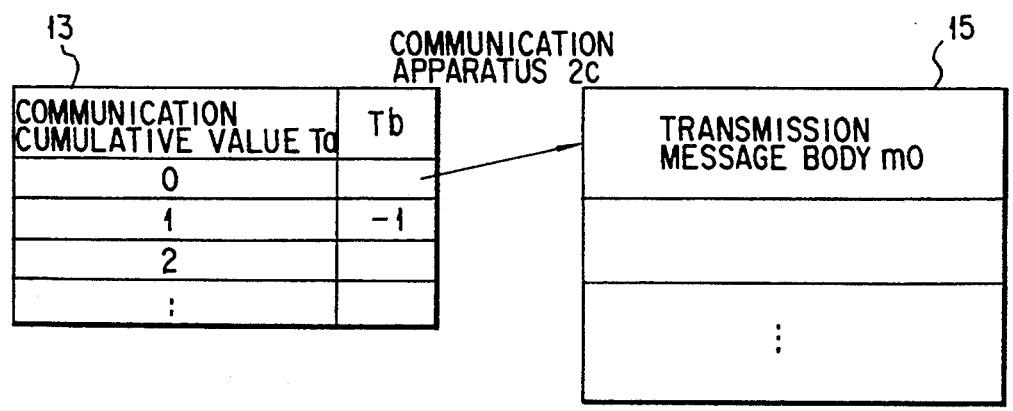

In addition, FIG. 11A through FIG. 11C show the communication history table 13 and the contents of transmission message buffer in the transmission and reception message buffer 15 in each of the communication apparatuses 2a, 2b and 2c after the completion of retransmission processing of message m0'.

Finally, there is explained a case where the communication apparatus incurring a message missing transmits a message and a normal communication apparatus receives that message.

In the embodiment, the communication apparatus 2a, for example, incurs at a time the reception error of the message m2 from the communication apparatus 2c, and moreover the communication apparatus 2a has transmitted a message m3 to which the value "0" is newly set as the communication cumulative value under the situation that the values of the latest communication cumulative values (initial value is "0" ) on the respective communication history tables 13 controlled by communication apparatuses 2a, 2b and 2c are set to "0", "1" and "1", respectively.

Now, suppose that a new message m3 is broadcasted from the communication apparatus 2a. In this case, since the communication apparatus 2a doesn't know the reception error, the message m3, wherein the "normal state" is set to the communication flag Md and "0" to the communication cumulative value section Mc as the latest communication cumulative value Ta on the communication history table 13, is broadcasted. At this time, since the communication apparatus 2b is in a state already having received the message m2 from the communication apparatus 2c, the value of latest communication cumulative value Ta in that communication history table memory 13 is "1" . Therefore, in the reception of message m3 from the communication apparatus 2a, the message missing is detected by the check of communication cumulative value at Step 706 (Step 707), and the retransmission processing unit 18 is driven using the communication cumulative value Mc in the message m3 and the transmission source (communication apparatus 2a) as parameters. In the detection unit 19 in the retransmission processing unit 18, the next processing is selectively executed in accordance with the relationship between the value ("0" ) of communication cumulative value Mc in the reception message m3 which is transferred as a parameter and the value ("1" ) of the latest communication cumulative value Ta on the communication history table 13 controlled by the corresponding communication apparatus (Step 710). In other words, if the communication cumulative value Mc in the reception message m3 is smaller than Ta as determined by a comparison between the value of the communication cumulative value section Mc in the reception message m3 and the latest communication cumulative value Ta on the communication history table 13, the detection unit 19 judges that the message missing happens in the communication apparatus 2a which is the transmission source.

After having registered the reception message m3 to the communication history table 13 similarly to the case of having received it normally (Step 714), the communication apparatus 2b transfers the reception message to the main processing unit 3 via the communication cumulative value comparison unit 16 in order to process it in the main processing unit 3 (Step 715).

Furthermore, similarly to the case of receiving the retransmission requested message, the search unit 20 of the retransmission processing unit 18 of the communication apparatus 2b searches for the transmission message which may be missed in order to specify the transmission source which has transmitted the message corresponding to a missed message due to a reception error in the communication apparatus 2a (Step 716). In other words, the search unit 20 searches for whether or not the missed message is a message broadcasted by the communication apparatus as the transmission source by the buffer pointer Tb corresponding to the communication cumulative value Ta on the communication history table 13 which corresponds to the value "0" of the communication cumulative value Mc in the reception message m3. In this case, since the communication apparatus 2b determines to have received the message m2 by the value "−1" of the buffer pointer Tb which corresponds to the communication cumulative value Ta=0, it judges that the communication apparatus 2b is not the transmission source of message m2 and ends the processing (Step 717).

On the other hand, since the communication apparatus 2c is the transmission source of message m2 wherein the value "0" is set to the communication cumulative value Mc, the value of the latest communication cumulative value Ta on the corresponding communication history table 13 is "1" . Therefore, in the reception of message m3 from the communication apparatus 2a, the message missing is detected by the check of the communication cumulative value at Step 706 (Step 707), and the retransmission processing unit 18 is driven using the value of Mc in the message m3 and the transmission source (communication apparatus 2a) as parameters. If the value of the communication cumulative value section Mc in the reception message m3 is smaller than Ta as determined by of comparing the value ("0" ) of the communication cumulative value section Mc in the reception message m3 which is transferred as a parameter and the value ("1") of latest communication cumulative value Ta on the communication history table 13 controlled by the corresponding communication apparatus in the detection unit 19 of retransmission processing unit 18, it decides that the message missing is caused in the communication apparatus 2a which is the transmission source. In this case, after having registered the reception message m3 to the communication history table 13 similarly to the case of normal reception (Step 714), the communication apparatus 2c transfers the reception message in the main processing unit 13 via the communication cumulative value comparison unit 16 in order to process it in the main processing unit 3 (Step 715).

Further, similarly to the case of having received the retransmission request message, the search unit 20 of the retransmission processing unit 18 of the communication apparatus 2c searches for the transmission message which may be missed in order to specify the transmission source of a message corresponding to a missed message due to a reception error in the communication apparatus 2a (Step 716). In other words, the search unit 20 decides whether or not the missed message is the message broadcasted by the corresponding communication apparatus, using the buffer pointer Tb corresponding to the communication cumulative value Ta on the communication history table 13 which corresponds to the value "0" of communication cumulative value Mc in the reception message m3 in the search unit 20. In this case, since the top address of transmission message buffer in which the message m2 having the communication cumulative value Mc set to "0" is stored, is recorded as the buffer pointer Tb corresponding to communication cumulative value Ta=0, the communication apparatus 2c decides that it has transmitted the message m2. Then, the retransmission unit 22 sends to the transmission processing unit 12 the retransmission request with the top address of the message to be retransmitted and the value "0" of communication cumulative value Ta for specifying the missed message as the parameters (Step 718). The message m2 is read out by the address designated by the buffer 15, with the communication flag Md set to "retransmission" mode, the communication cumulative value Mc set to "0", the destination apparatus Ma set to the communication apparatus 2a and with message-missing and the like added to the message m2. The message m2 is sent to the communication line, and broadcasted as the retransmission message m2' (Step 719). When the retransmission message m2' from the communication apparatus 2c is received by the communication apparatus 2a (Step 701), the message m2' is transferred to the communication cumulative value comparison unit 16 via the reception processing unit 17. When it is judged that the communication flag Md in the message m2' is "retransmission" (Step 702), the message m2' is transferred to the main processing unit 3 from the communication cumulative value comparison unit 16 for its reception processing (Step 703).

If the communication apparatus incurring the reception error transmits a normal message to the other communication apparatuses as described above, the processing is executed in the similar way.

In the above case, the communication apparatus 2a receives the message in the order of message m3 and message m2, while the other communication apparatus 2b and 2c receive the message in the order of message m2 and message m3. In this way, all of the communication apparatuses 2a, 2b and 2c can not receive the respective messages in the same order, but the reason why the communication apparatus 2a can transmit the messages despite the reception error is because the communication apparatus 2a does not depend on the transmission processing of message m3 on the message m2. If it depends on the message m2, the message m3 can not be transmitted unless the message m2 is received. For instance, if there is no dependency among the messages to be processed, there is a problem of capable handling equivalent to a problem in the distributed processing system, i.e., the problem of non-determination of processing. In other words, there is a problem that the execution order of processing is coercively changed by the execution timing and the result may differ at every processing. This problem is not handled here since it does not relate directly to the message reception error. In other words, if the dependency relationship is among the messages, the communication apparatus guarantees the reception order, but otherwise, it can be guaranteed that all the communication apparatuses can receive all the messages without any reception error.

FIGS. 12A and 12B show the flow of the detection of the reception error and the retransmission processing in the case that the communication apparatus that encountered a message reception error transmits a message when the latest communication cumulative value Ta on the communication history table 13 is larger than the value of communication cumulative value Mc in the reception message, for example, in the case where the communication apparatus 2a incurring the reception error transmits a message to the other normal communication apparatuses 2b and 2c.

According to this figure, the message missing incurred in the communication apparatus which has transmitted a message can be estimated from the cumulative value of accepted messages and moreover the message which may be missed can be specified. In other words, the communication apparatus not only controls the transmission and reception cycles of broadcast messages, but also compares the transmission and reception cycles with the transmission and reception cycles added to the received message, and thereby detects the reception error of message. The missed message can be retransmitted without the communication for confirming the reception between the communication apparatuses or its reception waiting time, and moreover the overhead of processing is kept as small as possible. Therefore, a distributed processing system wherein no acknowledge can be obtained can realize the broadcast communication with a high reliability.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A communication system comprising:
   a communication line along which messages may be communicated; and
   a plurality of communication apparatuses for transmitting message transmissions to the communication line by a broadcast communication and for receiving message receptions from the communication line, each of the communication apparatuses including
   counting means for cumulatively counting the message transmissions and message receptions of the communication apparatuses that occur by the broadcast communication to obtain a cumulative value;
   memory means for storing each cumulative value obtained by the counting means to form a communication history, the communication history including a current cumulative value and each prior cumulative value;
   message buffer means for temporarily storing each of the message transmissions and message receptions;
   addition means for adding the current cumulative value stored in the memory means to a new message transmission to be transmitted to the communication line;
   comparison means for comparing the current cumulative value stored in the memory means with the cumulative value that is added to a newly-received message reception;
   detection means for detecting based on results of the comparison by the comparison means whether a message missing has occurred and whether the message missing was incurred by the communication apparatus that transmitted the newly-received message reception or the communication apparatus receiving the newly-received message reception;

specifying means for specifying the missed message when the message missing occurrence and communication apparatus that incurred the message missing are detected by the detection means; and retransmission means for retransmitting the missed message specified by the specifying means to the communication apparatus that incurred the message missing.

2. A communication system according to claim 1, wherein the counting means increases the cumulative value when the newly-received message reception is received and transfers the increased cumulative value to the memory means to be stored into the memory means as the current cumulative value, and the detection means detects that the communication apparatus that transmitted the new-received message reception incurred the message missing when the cumulative value that was added to the newly-received message reception is smaller than the current cumulative value stored into the memory means.

3. A communication system according to claim 1, wherein the counting means increases the cumulative value when the newly-received message reception is received and transfers the increased cumulative value to the memory means to be stored into the memory means as the current cumulative value, and the detection means detects that the communication apparatus receiving the newly-received message reception has incurred the message missing when the cumulative value that was added to the newly-received message reception is greater than the current cumulative value stored into the memory means.

4. A communication system according to claim 1, wherein the memory means has a region for storing the cumulative value added to each received message reception and a region for storing a pointer address for the message buffer mean.

5. A communication system according to claim 4, wherein the message buffer means includes a transmission message buffer for storing message transmissions to be transmitted and a retransmission waiting queue buffer for storing message receptions for retransmission when message missing is detected.

6. A communication system according to claim 4, wherein the retransmission means regenerates and transmits the missed message specified by the specifying means by adding the cumulative value read out from the memory means to the corresponding message transmission read out of the message buffer means.

7. A communication system according to claim 1, wherein each of the communication apparatuses transmits message transmissions and receives message receptions that include message main data, destination data, transmission source data, the cumulative value that is added by the addition means, and a communication flag to indicate a communication mode.

8. A broadcasting method by use of a communication system comprising a communication line along which messages may be communicated and a plurality of communication apparatuses for transmitting message transmissions to the communication line by broadcast communication and for receiving message receptions from the communication line, the method comprising the steps of:

counting cumulatively the message transmissions and message receptions of the communication apparatuses that occur by the broadcast communication to obtain a current cumulative value;

storing temporarily the message transmissions and the message receptions;

adding the current cumulative value to a new message transmission to be transmitted to the communication line;

comparing the current cumulative value with a cumulative value that is added to a newly-received message reception;

detecting based on results of the comparison whether a message missing has occurred and whether the message missing was incurred by the communication apparatus that transmitted the newly-received message reception or the communication apparatus receiving the newly-received message reception;

specifying the missed message when the message missing occurrence and communication apparatus that incurred the message missing are detected; and retransmitting the specified missed message to the communication apparatus that incurred the message missing.

9. A communication method according to claim 8, wherein the counting step includes increasing the current cumulative value when the newly-received message reception is received, and the detecting step includes deciding that the communication apparatus that transmitted the newly-received message reception incurred the message missing when the cumulative value added to the newly-received message reception is smaller than the current cumulative value obtained by the counting step.

10. A communication method according to claim 8, wherein the counting step includes increasing the current cumulative value when the newly-received message reception is received, and the detection step includes deciding that the communication apparatus receiving the newly-received message reception has incurred the message missing when the cumulative value added to the newly-received message reception is larger than the current cumulative value obtained by the counting step.

11. A distributed communication system comprising:
a transmitting apparatus including
counting means for cumulatively counting message transmissions transmitted by broadcast communication so as to obtain a cumulative value, transmission memory means for storing each cumulative value obtained by the counting means to prepare a communication history including a current cumulative value and each prior cumulative value, addition means for adding the current cumulative value obtained by the counting means to a new message to be transmitted so as to produce a message transmission, a transmission processor for processing the message transmission, message transmission buffer means for temporarily storing the message transmission, a transmission reception processor for receiving a message reception from another transmission apparatus, transmission comparison means for comparing the current cumulative value stored in the transmission memory means with the cumulative value added to the message reception, and a transmission retransmission processor for receiving a retransmission request, detecting a requested message transmission corresponding to the retransmission request, and executing retransmission of the requested message transmission; and a receiving apparatus including a reception processor for receiving message transmissions from the transmitting apparatus as message receptions, reception memory means for storing the cumulative value added to each message reception received by broadcast communication to prepare a communication history including a current cumulative value and each prior cumulative value, reception comparison means for comparing the current cumulative value stored in the reception memory means with the cumulative value added to a newly-received message reception, a reception retransmission processor for detecting a missed message and requesting retransmission of the missed message, message reception buffer means for temporarily storing the newly-received message reception, the message reception buffer means having a retransmission waiting queue buffer, and a reception transmission processor for transmitting the retransmission request to the transmitting apparatus to request retransmission of the missed message detected by the reception retransmission processor.

12. A communication system comprising:

a plurality of communication apparatuses for transmitting message transmissions to a communication line by a broadcast communication and for receiving message receptions from the communication line, each communication apparatus including counting means for cumulatively counting the message transmissions and message receptions that occur by the broadcast communication to obtain a cumulative value, the counting means increasing the cumulative value when each message reception is received, wherein the increased cumulative value is referred to as a current cumulative value, memory means for storing each cumulative value obtained by the counting means to prepare a communication history including the current cumulative value and each prior cumulative value, addition means for adding the current cumulative value obtained by the counting means to a new message to be transmitted to produce a message transmission, a transmission processor for processing the message transmission, message buffer means for temporarily storing the message transmission, a reception processor for receiving a newly-received message reception from another communication apparatus, comparison means for comparing the current cumulative value stored in the memory means with the cumulative value added to the newly-received message reception, and a retransmission processor for detecting whether a missed message has occurred and for retransmitting the missed message when the missed message is detected as the message transmission stored in the message buffer means, the retransmission processor including detection means for detecting that the communication apparatus that transmitted the newly-received message reception incurred the missed message when the cumulative value that was added to the newly-received message reception is smaller than the current cumulative value stored in the memory means.

13. A communication system comprising:

a plurality of communication apparatuses for transmitting message transmissions to a communication line by a broadcast communication and for receiving message receptions from the communication line, each communication apparatus including counting means for cumulatively counting the message transmissions and message receptions that occur by the broadcast communication to obtain a cumulative value, the counting means increasing the cumulative value when each message reception is received, wherein the increased cumulative value is referred to as a current cumulative value, memory means for storing each cumulative value obtained by the counting means to prepare a communication history including the current cumulative value and each prior cumulative value, addition means for adding the current cumulative value to a new message to be transmitted to produce a message transmission, a transmission processor for processing the message transmission, message buffer means for temporarily storing the message transmission, a reception processor for receiving a newly-received message reception from another communication apparatus, comparison means for comparing the current cumulative value stored in the memory means with the cumulative value added to the newly-received message reception, and a retransmission processor for detecting whether a missed message has occurred and for retransmitting the missed message when requested by a retransmission request, the retransmission processor including detection means for detecting that the communication apparatus that received the newly-received message reception incurred the missed message when the cumulative value that was added to the newly-received message reception is greater than the current cumulative value stored in the memory means.

14. A communication system comprising:

a transmitting apparatus including counting means for cumulatively counting message transmissions and message receptions that occur by broadcast communication to obtain a cumulative value, the counting means increasing the cumulative value when each message reception is received, wherein the increased cumulative value is referred to as a current cumulative value, memory means for storing each cumulative value obtained by the counting means to prepare a communication history including the current cumulative value and each prior cumulative value, addition means for adding the current cumulative value to a new message to be transmitted to produce a message transmission, a transmission processor for processing the message transmission, message buffer means for temporarily storing the message transmission, a reception processor for receiving a newly-received message reception from another communication apparatus, comparison means for comparing the current cumulative value stored in the memory means with the cumulative value added to the newly-received message reception, and a retransmission processor for detecting whether a missed message has occurred and for retransmitting the missed message when the missed message is detected as the message transmission stored in the message transmission buffer, the retransmission processor including detection means for detecting that the transmitting apparatus, which received the newly-received message reception, incurred the missed message when the cumulative value that was added to the newly-received message reception is greater than the current cumulative value stored in the memory means.

15. A communication system comprising:

a receiving apparatus including counting means for cumulatively counting message receptions that occur by broadcast communication to obtain a cumulative value, the counting means increasing the cumulative value when each message reception is received, wherein the increased cumulative value is referred to as a current cumulative value, memory means for storing each cumulative value obtained by the counting means to prepare a communication history including the current cumulative value and each prior cumulative value, a reception processor for receiving a newly-received message reception from a transmitting apparatus, comparison means for comparing the current cumulative value stored in the memory means with the cumulative value added to the newly-received message reception, a retransmission processor for detecting whether a missed message has occurred and for requesting a retransmission of the missed message, message buffer means for temporarily storing each message reception, said message reception buffer means having a retransmission waiting queue buffer, and a transmission processor for transmitting a retransmission request to the transmitting apparatus to request the missed message detected by the retransmission processor.

* * * * *